United States Patent
Chintalapaty et al.

(10) Patent No.: US 11,113,640 B2
(45) Date of Patent: Sep. 7, 2021

(54) KNOWLEDGE-BASED DECISION SUPPORT SYSTEMS AND METHOD FOR PROCESS LIFECYCLE AUTOMATION

(71) Applicant: Tata Consultancy Services Limited, Mumbai (IN)

(72) Inventors: Sreedhar Chintalapaty, Frisco, TX (US); Seekar Ghodgaonkar, Glen Allen, VA (US); Dhamodararaj Kannan, Round Rock, TX (US); Aashish Chandra, Fremont, CA (US)

(73) Assignee: Tata Consultancy Services Limited, Mumbai (IN)

( * ) Notice: Subject to any disclaimer, the term of this patent is extended or adjusted under 35 U.S.C. 154(b) by 881 days.

(21) Appl. No.: 15/637,761

(22) Filed: Jun. 29, 2017

(65) Prior Publication Data

US 2018/0005146 A1  Jan. 4, 2018

Related U.S. Application Data

(60) Provisional application No. 62/356,084, filed on Jun. 29, 2016.

(51) Int. Cl.
*G06Q 10/06* (2012.01)

(52) U.S. Cl.
CPC .................. *G06Q 10/063* (2013.01)

(58) Field of Classification Search
CPC ..... G06Q 10/063; G06F 11/3495; G06N 5/02
(Continued)

(56) References Cited

U.S. PATENT DOCUMENTS 7,610,379 B2  10/2009  Hellbusch et al.
9,509,573 B2  11/2016  Thomas et al.
(Continued)

FOREIGN PATENT DOCUMENTS

EP   1855239 A1 * 11/2007 ........... G06Q 10/067
WO   WO-2013/134343    9/2013

OTHER PUBLICATIONS

Morisio; Investigating and Improving a COTS-Based Software Development Process; 2000; http://www.cs.umd.edu/users/basili/publications/proceedings/P89.pdf; p. 1-10.*

*Primary Examiner* — Jerry O'Connor
*Assistant Examiner* — James Webb
(74) *Attorney, Agent, or Firm* — Finnegan, Henderson, Farabow, Garrett & Dunner, LLP (57) ABSTRACT

Computer implemented knowledge-based decision support system and method is provided. The method includes registering one or more software applications and data sources; defining processes to be implemented by executing the registered one or more software applications; orchestrating execution of the registered one or more software applications for implementing the processes; monitoring system performance based on the execution of the registered one or more software applications; generating analytics data related to the monitored system performance; updating a database with historical data using the generated analytics data; generating an analytical report by analyzing, using a machine learning technique, the historical data stored in the database as well as the generated analytics data; generating automatically user interface based on at least one of a layout and a specification provided by a user; modifying execution of the registered one or more software applications based on the generated analytical report; and displaying data from the generated analytical report using the user interface.

12 Claims, 4 Drawing Sheets

(58) Field of Classification Search
USPC .......................................................... 705/7.11
See application file for complete search history.

(56) References Cited

U.S. PATENT DOCUMENTS

| | | | |
|---|---|---|---|
| 2004/0073565 A1* | 4/2004 | Kaufman | G06F 16/252 |
| 2007/0266051 A1* | 11/2007 | Moore | G06Q 10/067 |
| 2010/0083243 A1* | 4/2010 | Mincarelli | G06F 8/61 |
| | | | 717/173 |
| 2010/0318565 A1* | 12/2010 | Heil | H04L 41/22 |
| | | | 707/770 |
| 2013/0073614 A1* | 3/2013 | Shine | G06F 8/70 |
| | | | 709/203 |
| 2014/0310243 A1 | 10/2014 | McGee et al. | |
| 2015/0066816 A1* | 3/2015 | Charif | G06Q 10/067 |
| | | | 706/11 |
| 2018/0276256 A1* | 9/2018 | Sarkar | G06N 20/00 |

\* cited by examiner

KNOWLEDGE-BASED DECISION SUPPORT SYSTEMS AND METHOD FOR PROCESS LIFECYCLE AUTOMATION

RELATED APPLICATION

This application is related and claims the benefit of priority to U.S. Provisional Patent Application Ser. No. 62/356,084, filed on Jun. 29, 2016, entitled "knowledge-based systems for process lifecycle automation in decision support system", the entirety of which is incorporated herein by reference.

TECHNICAL FIELD

This disclosure relates generally to system and methods for process lifecycle automation, and more particularly, to knowledge-based systems and method for process lifecycle automation in decision support systems.

BACKGROUND

In current business world one of the biggest challenges of automating processes is "process discovery" that enables identifying a right process for a given organization for a current situation. In business processes, the decision making effort required to complete individual activities is intimately tied to the decision making effort required to determine which activities to perform and in what order. Large enterprises typically utilize a large number of heterogeneous, federated, and complex computing processes. Existing decision support systems cannot completely automate federated, heterogeneous processes. Consequently, process discovery and execution of such processes is error-prone and suboptimal in terms of efficiency and speed of execution. Since there is no single "source of truth" for information related to process execution of the complex, federated, heterogeneous (multi-system) processes, existing automated decision support systems do not support root cause analysis and processes for continuous improvement. The existing automated decision support systems are unable to support machine learning to provide automated decision support that is based on prior executions of the processes. Moreover, existing automated decision support systems require trained Information Technology (IT) professionals to be in the critical path for the business user's day to day work, sapping business agility.

The lack of support for system-wide closed-loop learning in complex processes spanning multiple software systems, makes it challenging to predict the impact of any individual decision. Therefore, decisions are typically made without the benefit of reliable, empirically sound forecasts of their impact, leading to uncertainty and undue expense. Two conditions further exacerbate such technical problems:

1. The enterprise is large and geographically distributed, with systems that are siloed; and
2. Large numbers of components (models) employ machine-learning techniques.

This sometimes leads to the abandonment of data-driven decision-making, precisely in areas where it would be most beneficial. Thus, current process management tools typically require skilled IT practitioners to create process definitions, making it difficult for common users to easily experiment with process variations and models. Consequently, it becomes challenging for companies to quickly react to the market and exploit business opportunities. In many case, IT is not just a support function but at the core of most operations.

SUMMARY

Embodiments of the present disclosure present technological improvements as solutions to one or more of the above-mentioned technical problems recognized by the inventors in conventional systems. In one embodiment of the present disclosure, a knowledge-based decision support system is disclosed, the system comprising: a hardware processor; and a memory unit storing instructions, which, when executed by the hardware processor, cause the hardware processor to perform acts comprising: registering one or more software applications and data sources; wherein at least one of the external software applications is a predictive analytical model; defining one or more processes to be implemented by executing the registered one or more software applications; orchestrating execution of the registered one or more software applications for implementing the one or more processes; monitoring system performance based on the execution of the registered one or more software applications; generating analytics data related to the monitored system performance; updating a database with the historical data using the generated analytics data; generating an analytical report by analyzing, using a machine learning technique, the historical data stored in the database as well as the generated analytics data; generating automatically user interface based on at least one of a layout and a specification provided by a user; modifying execution of the registered one or more software applications based on the generated analytical report; and displaying data from the generated analytical report using the automatically generated user interface.

In another embodiment, a knowledge-based decision support method is disclosed, comprising: registering, via a hardware processor, one or more software applications and data sources; wherein at least one of the external software applications is a predictive analytical model; defining, via the hardware processor, one or more processes to be implemented by executing the registered one or more software applications; orchestrating, via the hardware processor, execution of the registered one or more software applications for implementing the one or more processes; monitoring, via the hardware processor, system performance based on the execution of the registered one or more software applications; generating, via the hardware processor, analytics data related to the monitored system performance; updating, via the hardware processor, a database with historical data using the generated analytics data; generating, via the hardware processor, an analytical report by analyzing, using a machine learning technique, the historical data stored in the database as well as the generated analytics data; generating, via the hardware processor, automatically user interface based on at least one of a layout and a specification provided by a user; modifying, via the hardware processor, execution of the registered one or more software applications based on the generated analytical report; and displaying, via the hardware processor, data from the generated analytical report using the automatically generated user interface.

In yet another embodiment, a non-transitory computer-readable medium is disclosed, storing instructions, which, when executed by a hardware processor, cause the hardware processor to perform acts comprising: registering, via a hardware processor, one or more software applications and data sources; wherein at least one of the external software applications is a predictive analytical model; defining, via the hardware processor, one or more processes to be implemented by executing the registered one or more software applications; orchestrating, via the hardware processor, execution of the registered one or more software applications for implementing the one or more processes; monitoring, via the hardware processor, system performance based on the execution of the registered one or more software applications; generating, via the hardware processor, analytics data related to the monitored system performance; updating, via the hardware processor, a database with historical data using the generated analytics data; generating, via the hardware processor, an analytical report by analyzing, using a machine learning technique, the historical data stored in the database as well as the generated analytics data; generating, via the hardware processor, automatically user interface based on at least one of a layout and a specification provided by a user; modifying, via the hardware processor, execution of the registered one or more software applications based on the generated analytical report; and displaying, via the hardware processor, data from the generated analytical report using the automatically generated user interface.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
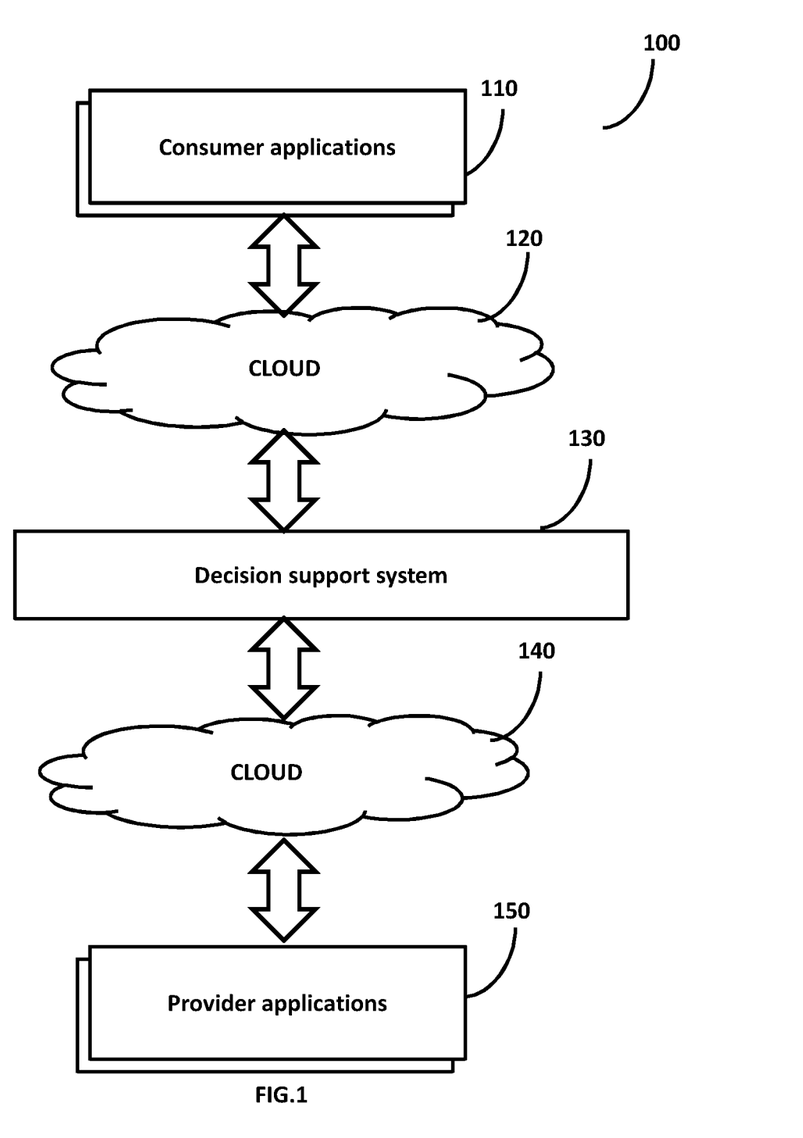
FIG. 1 illustrates a system 100 implementing process lifecycle automation, according to some embodiments.

FIG. 1 illustrates a system 100 implementing process lifecycle automation, according to some embodiments. The system 100 may include a combination of hardware and software modules to provide comprehensive closed-loop learning-based decision support for complex, multi-system processes.

The system 100 may, in some embodiments, orchestrate processes spanning multiple applications and organizations. Applications participating in the process can be seen as being of two types, for example: consumer application(s) 110 (those that define processes) and provider application(s) 150 (that execute one or more tasks within the process). Any given application may be a consumer application 110, a provider application 150, or simultaneously a consumer application 110 (e.g., for one overall process flow) and a provider 150 (e.g., for a second overall process flow). The system 100 may encompass two types of tasks: those executed by either a hardware or software component of system 100, and those executed by human actors (users). For enterprise processes defined within the system 100, the system 100 itself may be considered as the consumer application 110 or the provider application 150.

In some embodiments, system 100 may include one or more consumer applications 110, and one or more provider applications 150. Consumer applications 110 and provider applications 150 may be executing or implemented on one or more devices Device 1 through Device N described below with reference to FIG. 3. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In the system 100, the consumer applications 110 may define the computing processes to be performed by provider applications 150. The Consumer applications 110 and the provider applications 150 may communicate with each through, or involving, a decision support system 130 via one or more cloud networking systems (e.g., cloud 120 and cloud 140). These cloud networking systems may include, without limitation, a direct interconnection, local area network (LAN), wide area network (WAN), wireless network (e.g., using Wireless Application Protocol), the Internet, etc.

In some embodiments, the system 100 may provide federated, heterogeneous process orchestration as a service, support continuous improvement, and do so in a way that lets business users innovate at speed and scale. The system 100 may utilize the decision support system 130 to mediate between applications defining the process (e.g., consumer applications 110) and those involved in executing the process (e.g., provider applications 150), and monitoring the availability of the provider applications 150. The decision support system 130 may manage all metadata and historical data related to the consumer applications 110 and the provider applications 150. The decision support system, 130 may include a built-in recommender engine (depicted in FIG. 2) to analyze this data and provide decision support to users of the consumer applications 110 as well as those of the provider applications 150. The historical data may be also available for users to analyze and learn from.

Figure 2:
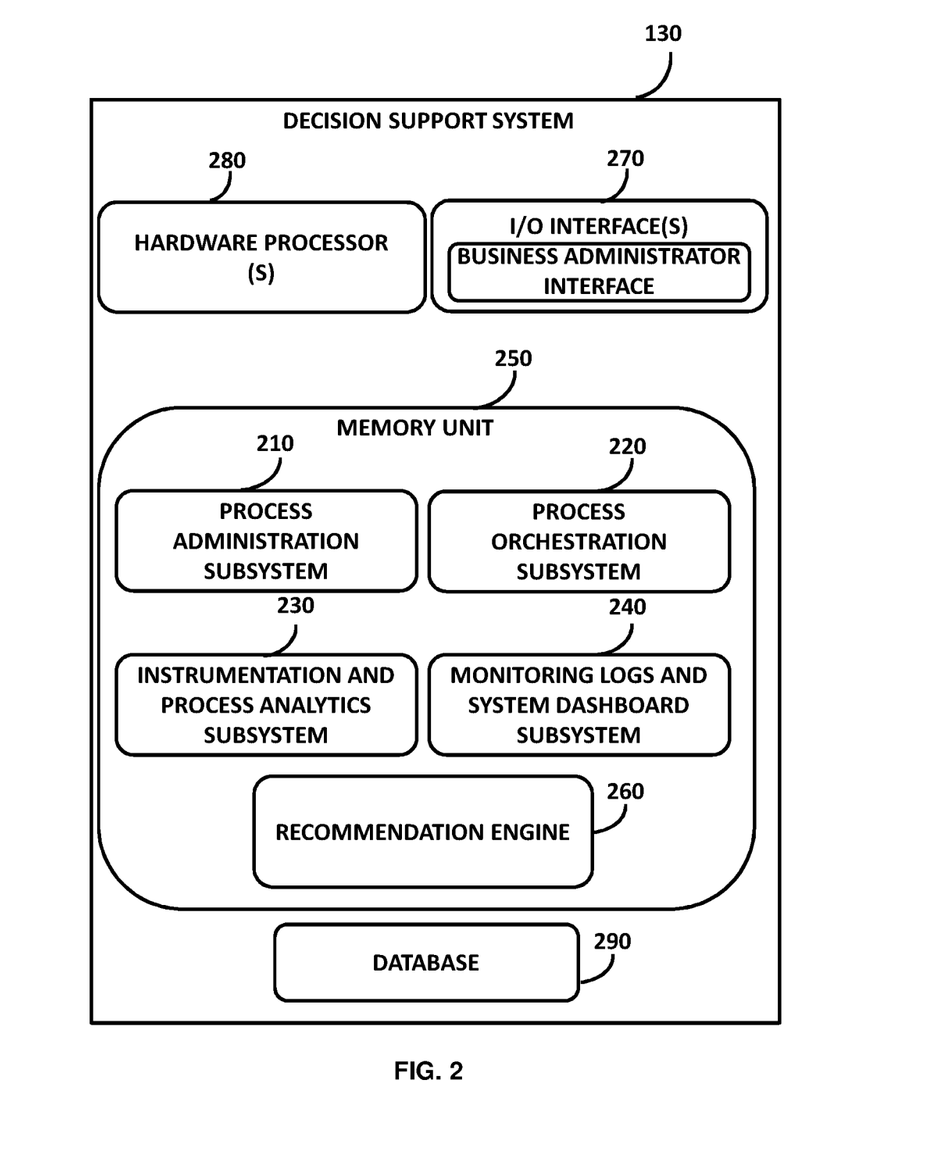
FIG. 2 illustrates a plurality of components of a decision support system 130 providing the process lifecycle automation, according to some embodiments.

FIG. 2 illustrates a plurality of components of the decision support system 130 providing the process lifecycle automation, according to some embodiments. In various embodiments, decision support system 130 enables full automation of process lifecycle by providing process orchestration as a service to an arbitrary number of applications. In some embodiments, the decision support system 130 may support instance-based attributes for tasks and processes. This may allow the decision support system 130 to enable user interface (UI) generation which, in turn, may enable additional features of decision support system 130, as discussed below. In addition, the decision support system 130 may utilize a simple, domain-specific, language to define and describe processes, as explained further below.

In some embodiments, the decision support system 130 include a hardware processor (s) 280, an Input/Output (I/O) interfaces (s) 270, a memory unit 250 and a database 290. The hardware processor 280 configured to implement instructions stored in a plurality of modules of the memory unit 250, the plurality of modules includes a process administration subsystem 210, a process orchestration subsystem 220, an instrumentation and process analytics subsystem 230, a monitoring logs and system dashboard subsystem 240 and a recommendation engine 260. Data generated during the processing such as, for example, intermediate data, the historical data, analytics data and the like may be stored in the database 290. The I/O interface 270 may enable the decision support system 130 to communicate with external components such as the consumer applications 110 and the provider applications 150 that may be installed on one or more devices (Device 1 through Device N) through the cloud 120 and the cloud 140 using any available communication network.

In some embodiments, process administration subsystem 210 may facilitate the users (business users) for defining and publishing processes and tasks for use with and by other users and processes. Task actors can be human, or any of the participating systems within the system 100. The process administration subsystem 210 may also enable the business users to provide specifications and layout for task user interfaces.

In some embodiments, decision support system 130, through the process administration subsystem 210, may administer federated processes that can be defined through a business administrator interface within the I/O interface 270. Process definitions can span applications and even organizations. Additionally, it is possible for the consumer applications 110 and provider applications 150 to completely outsource even their own internal workflows to management by the decision support system 130. This may be especially useful for large corporations that give their vendors and suppliers protected access to internal applications, and can significantly help improve coordination among the applications. All data related to process definition and execution, including audit trail, may be maintained in an operations database within decision support system 130. Embodiments of the decision support system 130 may scale out to support any number of process definitions and running instances.

In various embodiments, the decision support system 130 may facilitate individual experimentation by supporting multiple levels of access and publication of computing processes, such as consumer applications 110 and provider applications 150. Unless published, processes may not be executed by anyone but the creator, but processes published using the decision support system 130 may subject to access by other processes across system 100, but subject to access control by decision support system 130.

In some embodiments, the monitoring logs and system dashboard subsystem 240 may monitor all participating applications, consolidating logs, notifications, and keeping a record of the overall system 100's health. In some embodiments, the decision support system 130 may provide subscription and notification capabilities so that the system 100 proactively communicates to users. Once a process is defined (e.g., utilizing a combination of the consumer application 110, the provider application 150, and/or decision support system 130 itself), the decision support system 130 may monitor systems responsible for the various activities and tasks within the overall process. Whenever, a system become unresponsive, decision support system 130 may send out appropriate notifications immediately, so that remedial measures can be immediately taken by other applications and/or users.

The processes and constituent tasks may be defined by business users, rather than IT practitioners. Thus, the decision support system 130 may enable the ability to automatically generate user interfaces based on layouts and specifications given by the business user.

In some embodiments, the instrumentation and process analytics subsystem 230 may facilitate the acquisition and analysis of process execution data using various machine learning techniques for decision support. In addition to decision support, instrumentation and process analytics subsystem 230 may also identify performance issues and trigger notifications to appropriate users.

In some embodiments, the decision support system 130 may include a separate analytics database to capture instrumentation data as well as any data designated for process analytics and machine learning. By running various machine learning algorithms on this data using the instrumentation and process analytics subsystem 230, the decision support system 130 may be able to extract knowledge that is then used to provide decision support. In some embodiments, the decision support system 130 may allow manual as well as automatic execution of these machine learning algorithms. As the knowledge by the decision support system 130 of a process increases, the decision support system 130 may be able to provide full automation of overall processes carried out across diverse parts of the system 100.

In some embodiments, to help ease troubleshooting and root cause analysis, logs related to processes are managed centrally by the decision support system 130, no matter which participating applications generates the message.

In some embodiments, the process orchestration subsystem 220 may facilitate users and/or processes to create and run instances of other processes. Processes can be standard (pre-defined) or ad hoc. Ad hoc processes may be typically used for experimentation and might eventually be promoted to standard through a standards voting system or other automated procedure. The process orchestration subsystem 220 may also enable control of running instances, e.g., where running instances can be stopped or modified.

Further, process orchestration by the decision support system 130, via the process orchestration subsystem 220, as a service paradigm also may potentially impact how applications are developed within the organization. Rather than building large, monolithic applications with internal support for workflow, embodiments of the decision support system 130 enable architecting them as small applications which can then be strung together in various ways using the decision support system 130 as the orchestrator. In addition to making it possible to finally be rid of duplicated development effort, embodiments of the decision support system 130 may enable accelerated innovation within the organization by allowing rapid development of applications that utilize a number of other applications.

Accordingly, embodiments of the decision support system 130 may provide one or more of at least five features:

a) Registration and classification of external software applications (including predictive analytical models) and data sources;

b) Definition of processes spanning across any of the registered systems;

c) Execution and instrumentation of defined processes (including ad hoc processes);

d) Monitoring system performance and act as an advance warning system; and e) Acquisition and analysis of execution data using various machine learning techniques to determine and dispense guidance to users.

Figure 3:
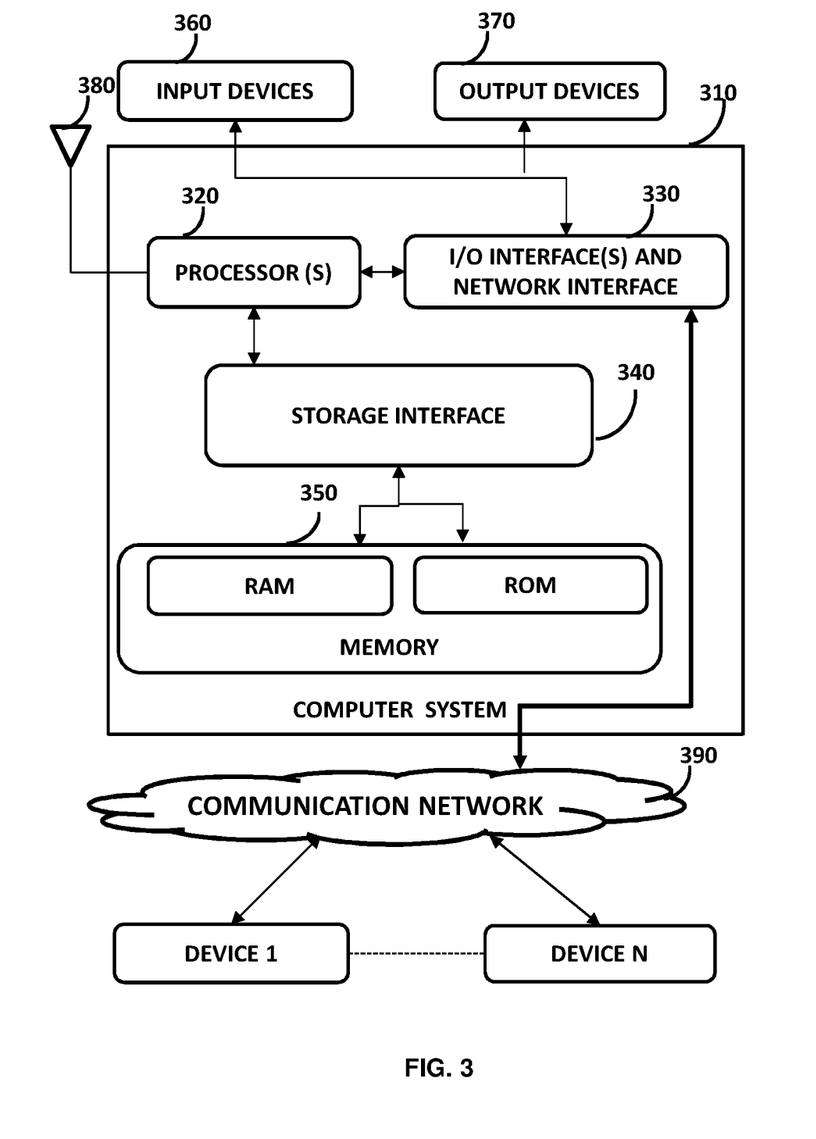
FIG. 3 illustrates a block diagram of an exemplary computer system 310 for implementing embodiments consistent with the present disclosure for decision support, providing process lifecycle automation, according to some embodiments.

FIG. 3 illustrates a block diagram of an exemplary computer system 310 for implementing embodiments consistent with the present disclosure for decision support, providing process lifecycle automation, according to some embodiments. Variations of computer system 310 may be used for implementing the embodiments of the decision support system 130 disclosed herein. The computer system 310 comprise a central processing unit ("CPU" or "processor") 320. The processor 320 comprise at least one data processor for executing program components for executing user- or system-generated requests. A user may include a person, a person using a device such as those included in this disclosure, or such a device itself. The processor 320 may include specialized processing units such as integrated system (bus) controllers, memory management control units, floating point units, graphics processing units, digital signal processing units, etc. The processor 320 may include a microprocessor, such as AMD Athlon, Duron or Opteron, ARM's application, embedded or secure processors, IBM PowerPC, Intel's Core, Itanium, Xeon, Celeron or other line of processors, etc. The processor 320 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

The processor 320 may be disposed in communication with one or more input/output (I/O) devices via I/O interface 330. The I/O interface 330 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 330, the computer system 310 may communicate with one or more I/O devices (360 and 370). For example, the input device 360 the may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like, stylus, scanner, storage device, transceiver, video device/source, visors, etc. The output devices 370 may be a printer, fax machine, video display (e.g., cathode ray tube (CRT), liquid crystal display (LCD), light-emitting diode (LED), plasma, or the like), audio speaker, etc. In some embodiments, a transceiver 380 may be disposed in connection with the processor 320. The transceiver 380 may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 320 may be disposed in communication with a communication network 390 via a network interface within the I/O interface 330. The network interface may communicate with the communication network 390. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 390 may include, without limitation, a direct interconnection, local area network (LAN), wide area network (WAN), wireless network (e.g., using Wireless Application Protocol), the Internet, etc. Using the network interface and the communication network 390, the computer system 310 may communicate with Device 1 through Device N. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 310 may itself embody one or more of these devices.

In some embodiments, the processor 320 may be disposed in communication with memory 350 comprising one or more memory devices (e.g., RAM 313, ROM 314, etc.) via a storage interface 340. The storage interface 340 may connect to the memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing the databases or other memories disclosed herein.

The memory devices may store a collection of program or database components, including, without limitation, an operating system, user interface application, web browser, mail server, mail client, user/application data (e.g., any data variables or data records discussed in this disclosure), etc. The operating system may facilitate resource management and operation of the computer system 310. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. The user interface may facilitate display, execution, interaction, manipulation, or operation of program components through textual or graphical facilities. For example, user interfaces may provide computer interaction interface elements on a display system operatively connected to the computer system 310, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 310 may implement a web browser stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 310 may implement a mail server stored program component. The mail server may be an Internet mail server such as Microsoft Exchange, or the like. The mail server may utilize facilities such as ASP, ActiveX, ANSI C++/C#, Microsoft.NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 301 may implement a mail client 320 stored program component. The mail client may be a mail viewing application, such as Apple Mail, Microsoft Entourage, Microsoft Outlook, Mozilla Thunderbird, etc.

In some embodiments, computer system 310 may store user/application data, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

Figure 4:
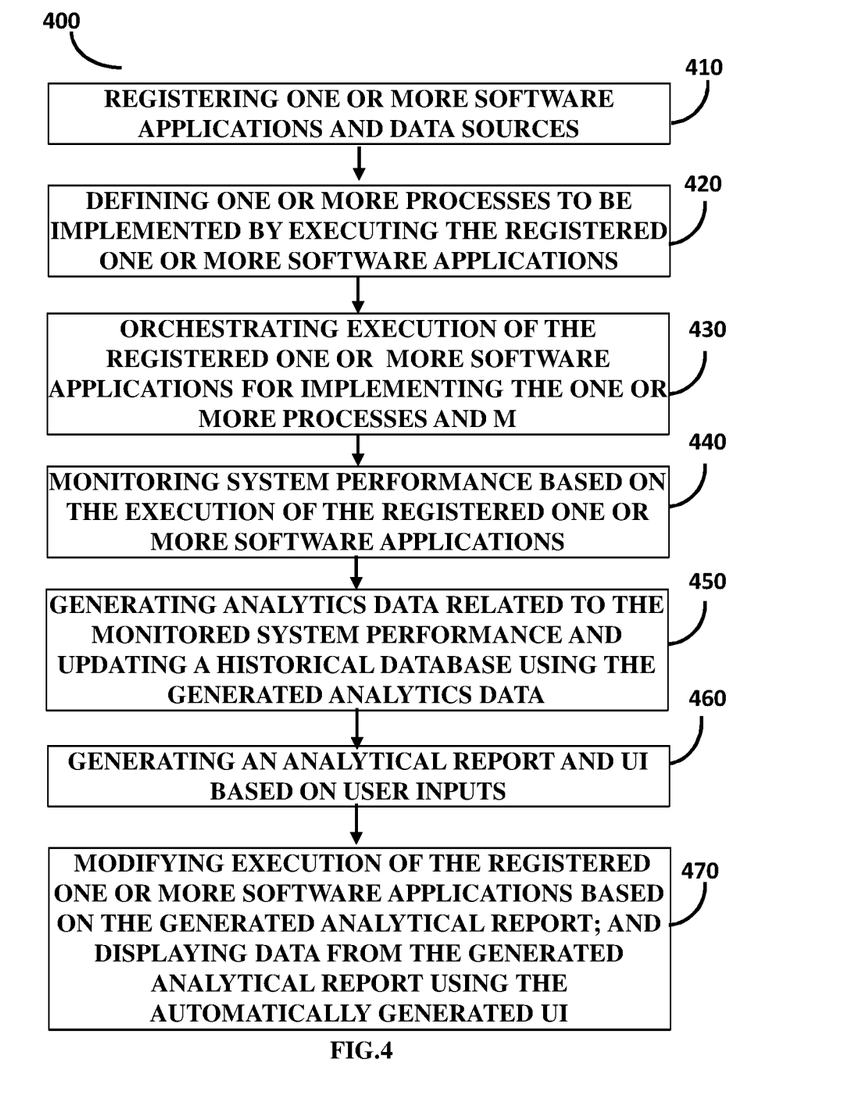
FIG. 4 is a flow diagram illustrating a method 400 for decision support providing process lifecycle automation, according to some embodiments.

FIG. 4 is a flow diagram illustrating a method 400 for decision support providing process lifecycle automation, according to some embodiments. In an embodiment, the method 400 allows the decision support system 130 via one or more components of the decision support system to perform action specified by the method steps 410 through 490 of the method 400.

At step 410, the method 400 includes registering, via the hardware processor 280, one or more software applications and data sources, wherein the registered one or more software applications comprise at least one external software application, wherein the external software application is a predictive analytical model. At step 420, the method 400 includes defining, via the hardware processor 280, one or more processes to be implemented by executing the registered one or more software applications. The one or more processes are federated process, wherein the method 400 comprises administering the federated processes as defined by the business administrator interface (within the I/O 270) utilizing the process administration subsystem. At step 430, the method 400 includes orchestrating, via the hardware processor 280, execution of the registered one or more software applications for implementing the one or more processes. The method 400 comprises managing internal workflows of the registered one or more software processes when the registered one or more software processes outsource the management of the internal workflows. At step 440, the method 400 includes monitoring, via the hardware processor 280, system performance based on the execution of the registered one or more software applications. At step 450, the method 400 includes generating, via the hardware processor 280, analytics data related to the monitored system performance. At step 450, the method 400 further includes updating, via the hardware processor 280, a historical database using the generated analytics data. At step 460, the method 400 include generating, via the hardware processor 280, an analytical report by analyzing, using a machine learning technique, data stored in the historical database as well as the generated analytics data. The method 400 comprises providing decision support to the user by analyzing the historical data utilizing the recommendation engine, further providing the historical data to the user for analysis and learning. At step 460, the method 400 further includes generating automatically, via the hardware processor 280, the user interface based on user inputs, wherein the user inputs comprise at least one of a layout and a specification provided by a user. In an embodiment, the user interface may be generated utilizing the process administration subsystem. At step 460, the method 400 further includes modifying, via the hardware processor 280, execution of the registered one or more software applications based on the generated analytical report. At step 460, the method 400 further includes displaying, via the hardware processor 280, data from the generated analytical report using the automatically generated user interface. The displayed data may provide insights to the user on implications of a current selected decision and the user can take corrective measures to refine his decisions to reach closer and closer to the predefined objective.

The method 400 comprises facilitating the acquisition and analysis of process execution data using various machine learning techniques, identifying performance issues of the one or more processes and trigger monitoring one or more systems responsible for the activities and tasks within a process among the processes, wherein the hardware processor is configured to send notifications immediately at least one of a corresponding software applications and the users utilizing the software application for implementing remedial measures. The method comprises supporting multiple levels of access and publication of one or more processes for individual experimentation.

The specification has described knowledge-based systems for process lifecycle automation in decision support systems. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A knowledge-based decision support system providing process lifecycle automation, the decision support system comprising:
    a hardware processor;
    an Input/Output (I/O) interface comprising a business administrator interface;
    a memory unit storing instructions, wherein the memory unit comprises at least one of a process administration subsystem, a process orchestration subsystem, instrumentation and process analytics subsystem, a monitoring logs and system dashboard subsystem and a recommendation engine, wherein instructions in the memory unit when executed by the hardware processor, cause the hardware processor to perform acts comprising:
        registering one or more software applications and data sources, wherein the registered one or more software applications comprise at least one external software application, wherein the external software application is a predictive analytical model;
        defining one or more processes to be implemented by executing the registered one or more software applications, wherein the definition of the one or more processes span across the one or more software applications;
        orchestrating execution of the registered one or more software applications for implementing the one or more processes, wherein the orchestration facilitates users utilizing the software application or the processes to create and run instances of other processes, wherein the processes includes ad hoc processes for experimentation;
        monitoring system performance based on the execution of the registered one or more software applications, by:
            facilitating acquisition and analysis of process execution data using various machine learning techniques;
            identifying performance issues of the one or more processes; and
            triggering notifications to one or more users indicating the performance issues, wherein the notifications are sent to at least one of a corresponding software application and the users utilizing the software application for implementing remedial measures;
        generating analytics data related to the monitored system performance;
        updating a database with historical data using the generated analytics data;
        generating an analytical report by analyzing, using a machine learning technique, the historical data stored in the database and the generated analytics data;
        generating automatically, a user interface based on user inputs, wherein the user inputs comprise at least one of a layout and a specification provided by a user;
        modifying execution of the registered one or more software applications based on the generated analytical report; and
        displaying data from the generated analytical report using the automatically generated user interface.

2. The decision support system as claimed in claim 1, wherein the hardware processor is configured to generate automatically, the user interface utilizing the process administration subsystem.

3. The decision support system as claimed in claim 1, wherein the one or more processes are federated process, wherein the hardware processor is configured to administer the federated processes as defined by the business administrator interface utilizing the process administration subsystem.

4. The decision support system as claimed in claim 1, wherein the hardware processor is configured to manage internal workflows of the registered one or more software processes when the registered one or more software processes outsource the management of the internal workflows.

5. The decision support system as claimed in claim 1, wherein the hardware processor is configured to provide decision support to the user by analyzing the historical data utilizing the recommendation engine, further the hardware processor is configured to provide the historical data to the user for analysis and learning.

6. The decision support system as claimed in claim 1, wherein the hardware processor is configured to support multiple levels of access and publication of one or more processes for individual experimentation.

7. A knowledge-based decision support method providing process lifecycle automation, the method comprising:
    registering, via a hardware processor, one or more software applications and data sources, wherein the registered one or more software applications comprise at least one external software application, wherein the external software application is a predictive analytical model;
    defining, via the hardware processor, one or more processes to be implemented by executing the registered one or more software applications, wherein the definition of the one or more processes span across the one or more software applications;
    orchestrating, via the hardware processor, execution of the registered one or more software applications for implementing the one or more processes, wherein the orchestration facilitates users utilizing the software application or the processes to create and run instances of other processes, wherein the processes includes ad hoc processes for experimentation;

monitoring, via the hardware processor, system performance based on the execution of the registered one or more software applications by:
    facilitating acquisition and analysis of a process execution data using machine learning techniques;
    identifying performance issues of the one or more processes; and
    triggering notifications to one or more users indicating the performance issues, wherein the notifications are sent to at least one of a corresponding software application and the users utilizing the software application for implementing remedial measures;
generating, via the hardware processor, analytics data related to the monitored system performance;
updating, via the hardware processor, a database with historical data using the generated analytics data;
generating, via the hardware processor, an analytical report by analyzing, using a machine learning technique, the historical data stored in the database as well as the generated analytics data;
generating automatically, a user interface based on user inputs, wherein the user inputs comprise at least one of a layout and a specification provided by a user;
modifying, via the hardware processor, execution of the registered one or more software applications based on the generated analytical report; and
displaying, via the hardware processor, data from the generated analytical report using the automatically generated user interface.

8. The method as claimed in claim 7, wherein the one or more processes are federated process, wherein the method comprises administering the federated processes as defined by a business administrator interface.

9. The method as claimed in claim 7, wherein the method comprises managing internal workflows of the registered one or more software processes when the registered one or more software processes outsource the management of the internal workflows.

10. The method as claimed in claim 7, wherein the method comprises providing decision support to the user by analyzing the historical data utilizing and providing the historical data to the user for analysis and learning.

11. The method as claimed in claim 7, wherein the method comprises supporting multiple levels of access and publication of one or more processes for individual experimentation.

12. A non-transitory computer-readable medium storing instructions, which, when executed by a hardware processor, cause the hardware processor to perform acts comprising:

registering, via a hardware processor, one or more software applications and data sources, wherein the registered one or more software applications comprise at least one external software application, wherein the external software application is a predictive analytical model;
defining, via the hardware processor, one or more processes to be implemented by executing the registered one or more software applications, wherein the definition of the one or more processes span across the one or more software applications;
orchestrating, via the hardware processor, execution of the registered one or more software applications for implementing the one or more processes, wherein the orchestration facilitates users utilizing the software application or the processes to create and run instances of other processes, wherein the processes includes ad hoc processes for experimentation;
monitoring, via the hardware processor, system performance based on the execution of the registered one or more software applications by:
    facilitating acquisition and analysis of a process execution data using machine learning techniques;
    identifying performance issues of the one or more processes; and
    triggering notifications to one or more users indicating the performance issues, wherein the notifications are sent to at least one of a corresponding software application and the users utilizing the software application for implementing remedial measures;
generating, via the hardware processor, analytics data related to the monitored system performance;
updating, via the hardware processor, a database with historical data using the generated analytics data;
generating, via the hardware processor, an analytical report by analyzing, using a machine learning technique, the historical data stored in the database as well as the generated analytics data;
generating automatically, a user interface based on user inputs, wherein the user inputs comprise at least one of a layout and a specification provided by a user;
modifying, via the hardware processor, execution of the registered one or more software applications based on the generated analytical report; and
displaying, via the hardware processor, data from the generated analytical report using the automatically generated user interface.

\* \* \* \* \*